United States Patent
Niu et al.

(10) Patent No.: US 11,392,586 B2
(45) Date of Patent: Jul. 19, 2022

(54) DATA PROTECTION METHOD AND DEVICE AND STORAGE MEDIUM

(71) Applicant: ZTE CORPORATION, Shenzhen (CN)

(72) Inventors: Jiahao Niu, Shenzhen (CN); Qiang Zhang, Shenzhen (CN); Shanhong Shen, Shenzhen (CN); Dezheng Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 105 days.

(21) Appl. No.: 16/771,600

(22) PCT Filed: Apr. 1, 2019

(86) PCT No.: PCT/CN2019/080780
§ 371 (c)(1),
(2) Date: Jun. 10, 2020

(87) PCT Pub. No.: WO2019/210758
PCT Pub. Date: Nov. 7, 2019

(65) Prior Publication Data
US 2020/0301917 A1    Sep. 24, 2020

(30) Foreign Application Priority Data
May 2, 2018    (CN) .......................... 201810411644.8

(51) Int. Cl.
G06F 16/2455    (2019.01)
G06F 16/22    (2019.01)
(Continued)

(52) U.S. Cl.
CPC ............ *G06F 16/2455* (2019.01); *G06F 9/54* (2013.01); *G06F 16/2282* (2019.01);
(Continued)

(58) Field of Classification Search
None
See application file for complete search history.

(56) References Cited

U.S. PATENT DOCUMENTS

| 10,716,078 | B2 * | 7/2020 | Andersson | H04L 5/0007 |
| 2005/0216746 | A1 * | 9/2005 | Saika | G06F 21/6218 713/182 |

(Continued)

FOREIGN PATENT DOCUMENTS

| CN | 106407835 A | 2/2017 |
| CN | 106959955 A | 7/2017 |
| CN | 107766741 A | 3/2018 |

OTHER PUBLICATIONS

International Search Report for Application No. PCT/CN2019/080780, dated Jun. 24, 2019, 4 pages.
(Continued)

*Primary Examiner* — Kim T Nguyen
(74) *Attorney, Agent, or Firm* — Morgan, Lewis & Bockius LLP

(57) ABSTRACT

Disclosed are a data protection method and device and a storage medium. The method includes that a database execution engine receives data request information sent by a client; a preset policy corresponding to an identity of the client carried in the data request information is acquired and the database execution engine performs a data protection operation for requested data according to the preset policy to obtain target data; and the database execution engine sends the target data to the client.

19 Claims, 6 Drawing Sheets

(51) Int. Cl.
*G06F 16/248* (2019.01)
*G06F 9/54* (2006.01)
*G06F 21/62* (2013.01)
*G06N 5/02* (2006.01)

(52) U.S. Cl.
CPC ........ *G06F 16/248* (2019.01); *G06F 21/6254* (2013.01); *G06N 5/025* (2013.01)

(56) References Cited

U.S. PATENT DOCUMENTS

| | | | |
|---|---|---|---|
| 2007/0005155 A1* | 1/2007 | Aoki | G06F 21/6245 |
| | | | 700/55 |
| 2007/0086338 A1 | 4/2007 | Robert et al. | |
| 2008/0072319 A1* | 3/2008 | Sakai | G06F 21/6218 |
| | | | 726/21 |
| 2012/0087231 A1* | 4/2012 | Zhang | G10L 19/005 |
| | | | 370/216 |
| 2012/0259877 A1 | 10/2012 | Raghunathan et al. | |
| 2018/0118033 A1* | 5/2018 | Lu | B60L 3/12 |
| 2019/0144025 A1* | 5/2019 | Gao | B61L 27/04 |
| | | | 701/19 |
| 2019/0268155 A1* | 8/2019 | Guo | H04W 12/126 |
| 2020/0301917 A1* | 9/2020 | Niu | G06F 21/6218 |

OTHER PUBLICATIONS

Extended European Search Report for Application No. 19796792.0, dated Nov. 29, 2021, 8 pages.

\* cited by examiner

| Big-data service name | | | | |
|---|---|---|---|---|
| | Resource entity | Database name | | |
| | | Table name | | |
| | | Column name | | Sensitive-data domain / Drop-down list |
| | Identity | User name | | Role name |
| | | User group name | | |
| | Protection policy | Filtering rule | | |
| | | Masking rule | Select masking rule | |

DATA PROTECTION METHOD AND DEVICE AND STORAGE MEDIUM

CROSS-REFERENCES TO RELATED APPLICATION

This is a National stage application, filed under 37 U.S.C. 371, of International Patent Application No. PCT/CN2019/080780, filed on Apr. 1, 2019, which the present application is based on and claims priority to a Chinese patent application No. 201810411644.8 filed on May 2, 2018, disclosures of which are incorporated herein by reference in their entireties.

TECHNICAL FIELD

The present disclosure relates to, but is not limited to, communications and, in particular, relates to a data protection method and device and a storage medium.

BACKGROUND

Data masking is a technology that uses masking rules to change the form of the data of some sensitive information so as to achieve reliable protection of sensitive personal data. In the related art, technologies, solutions and products for implementing database masking usually perform masking through an external masking server or masking proxy gateway in the manner of middleware conversion. However, this data masking mode involves difficult operation for data protection in the big-data environment.

SUMMARY

In view of this, embodiments of the present disclosure are expected to provide a data protection method and device and a storage medium to solve at least the problem of difficult operation for data protection in the big-data environment in the related art.

An embodiment of the present application provides a data protection method. The method includes that a database execution engine receives data request information sent by a client; and a preset policy corresponding to an identity of the client carried in the data request information is acquired and the database execution engine performs a data protection operation for requested data according to the preset policy to obtain target data.

An embodiment of the present application provides a data protection device. The device includes a receiving module, which is configured to receive data request information sent by a client; and a data protection module, which is configured to acquire a preset policy corresponding to an identity of the client carried in the data request information and perform a data protection operation for requested data according to the preset policy to obtain target data.

An embodiment of the present application provides a storage medium that stores a computer program. When the computer program is executed, the data protection method provided in the embodiment of the present application is performed.

An embodiment of the present application provides an electronic device that includes a memory and a processor. The memory stores a computer program and the processor is configured to execute the computer program to perform the data protection method provided in the embodiment of the present application.

Through the present application, a database execution engine receives data request information sent by a client; a preset policy corresponding to an identity of the client carried in the data request information is acquired and the database execution engine performs a data protection operation for requested data according to the preset policy to obtain target data; and the database execution engine sends the target data to the client. This solves the problem of difficult operation for data protection in the big-data environment in the related art. In the present application, the solution of using an external masking server is abandoned and a data protection device is built in a big-data database execution engine so that a high-performance data protection function is achieved by using the distributed processing capability of the big-data database execution engine without changing the user request logic and the original data value.

DETAILED DESCRIPTION

The present application will be described hereinafter in detail with reference to the drawings and in connection with the embodiments. It is to be noted that if not in collision, the embodiments and features therein in the present application can be combined with each other.

It is to be noted that the terms "first", "second" and the like in the description, claims and drawings of the present application are used to distinguish between similar objects and are not necessarily used to describe a particular order or sequence.

Figure 1:
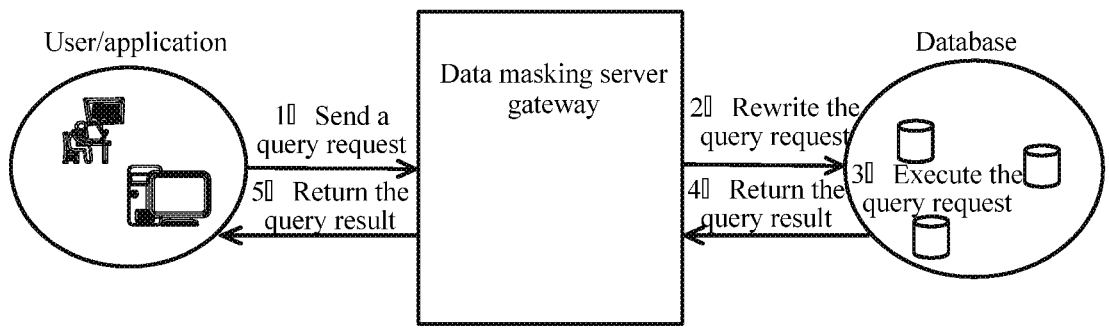
FIG. 1 is a flowchart of data protection by a masking server in the related art.

FIG. 1 is a flowchart of data protection by a masking server in the related art. As shown in FIG. 1, the process includes the steps described below.

In step 1, a query request is sent.

Here, in actual implementation, an application sends the request to a data masking server.

In step 2, the query request is rewritten.

Here, in actual implementation, the data masking server receives and parses the data access request and determines that this access involves sensitive data.

In step 3, the query request is executed.

Here, in actual implementation, the data masking server modifies the data access request to obtain a masked-data access request and sends the masked-data access request to a database (also referred to as the database execution engine).

In step 4, the database returns the query request.

Here, in actual implementation, the database obtains the data query result according to the masked-data access request and replaces sensitive data in the query result data with preset information to obtain masked data.

In step 5, the masking server returns the query request.

Here, in actual implementation, the masking server receives the masked data returned by the database and outputs the masked data to the application.

This data protection solution has the deficiencies described below.

(1) Special masking middleware, that is, an external data masking server, is needed. This increases the complexity and the costs of software and hardware and incurs high operation and maintenance costs.

(2) Both the query request and the result return need to pass through masking middleware. This consumes a lot of network bandwidth and computation and storage resources. The performance is poor and the degree of concurrency is not high. Big data is generally a large data set with a large volume of data. Data at PB level has been formed in many practical applications. When the amount of data is very large, the method of using middleware cannot meet the response time requirements of the high-performance dynamic real-time masking of massive data in big-data scenarios.

(3) The result data returned by the database needs to be buffered in the masking server, bringing the hidden danger of data leakage.

(4) The application mode of the application system is changed. Complete transparency to applications cannot be achieved. It is needed to change the database access address and port. The habits of users are changed, and a heavy workload is brought to the system migration.

In view of the shortcomings and deficiencies of the preceding solution, this embodiment of the present application provides a solution for a user equipment to acquire data from a database execution engine. Different from the related art, this database execution engine is embedded with a data protection device and performs data protection internally after receiving data request information from the client. The data protection may include data masking and data filtering.

Figure 2:
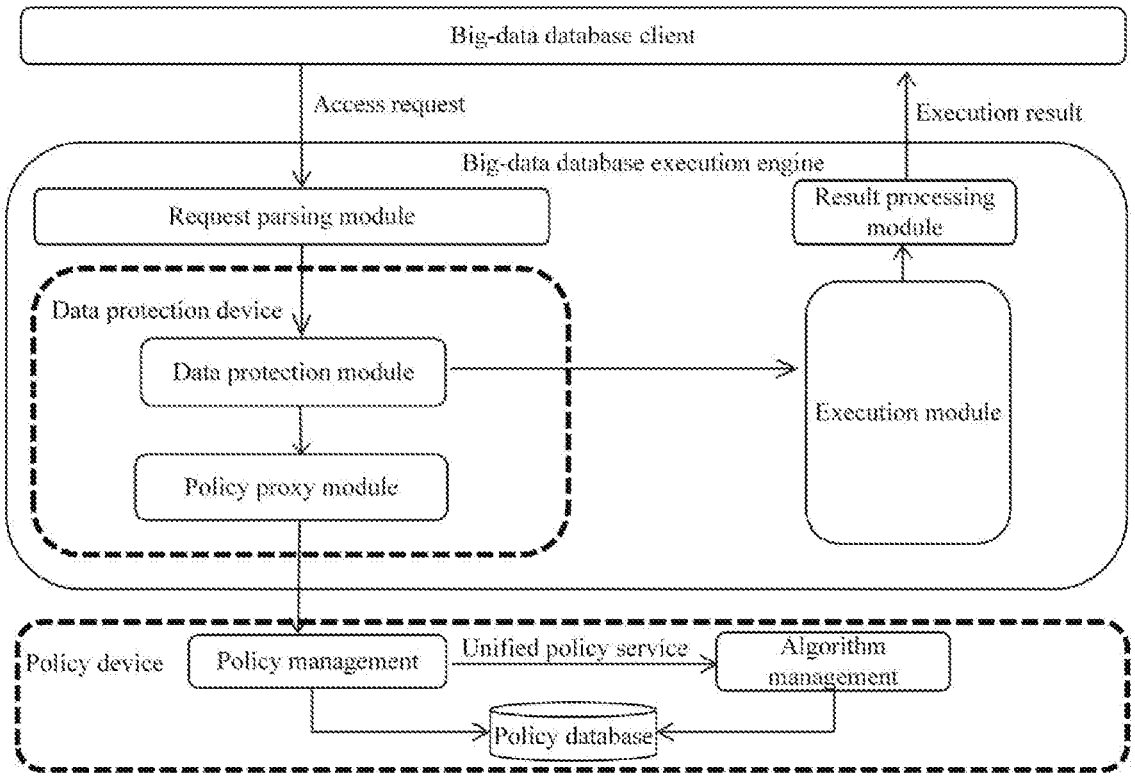
FIG. 2 is a block diagram of a big-data sensitive-data protection device according to an embodiment of the present application.

This embodiment of the present application may run on the network architecture shown in FIG. 2. FIG. 2 is a block diagram of a big-data sensitive-data protection device according to an embodiment of the present application. As shown in FIG. 2, the network architecture includes at least a big-data database client, a big-data database execution engine and a unified policy service. For the description of the device modules of each part, see the subsequent embodiments of the present application.

In this embodiment, a data protection method running on the preceding network architecture is provided. The process includes the steps described below.

In step 1, a database execution engine (equivalent to the big-data database execution engine in FIG. 2) receives data request information sent by a client.

In step 2, a preset policy corresponding to an identity of the client carried in the data request information is acquired and the database execution engine performs a data protection operation for requested data according to the preset policy to obtain target data.

In an embodiment, step 3 is included. In step 3, the database execution engine sends the target data to the client.

Through the preceding steps, a database execution engine receives data request information sent by a client; a preset policy corresponding to an identity of the client carried in the data request information is acquired and the database execution engine performs a data protection operation for requested data according to the preset policy to obtain target data; and the database execution engine sends the target data to the client. This solves the problem of difficult operation for data protection in the big-data environment in the related art. In the present application, the solution of using an external masking server is abandoned and a big-data database execution engine is embedded with a data protection device so that a high-performance data protection function is achieved by using the distributed processing capability of the big-data database execution engine without changing the user request logic and the original data value.

In an embodiment, performing, by the database execution engine, the data protection operation for the requested data according to the preset policy includes performing, by the database execution engine, a data filtering operation and/or a data masking operation for the requested data according to the preset policy, where the preset policy comprises a filtering rule and/or a masking rule.

In an embodiment, the database execution engine performs the data filtering operation and/or the data masking operation for the requested data in one of the following manners: the data protection module performs the data masking operation after performing the data filtering operation for the requested data; embeds a data filtering operation flow during a process of the data masking operation; performs the data filtering operation for the requested data; or performs the data masking operation for the requested data.

In an embodiment, in the case where a Structured Query Language (SQL) statement is received by a database, the database execution engine performs the data masking operation for the requested data according to the preset policy includes one of the following manners: the database execution engine generates an Abstract Syntax Tree (AST) according to the SQL statement, deeply traverses the AST to acquire table names and field names on which multiple outermost output fields of the SQL statement depend layer by layer; and performs the data masking operation for output fields corresponding to the field names in the multiple outermost output fields of the SQL statement. The outermost layer of the SQL statement is called the top layer.

In the present application document, the table name may also be the alias of a table and the field name may also the alias of a field.

In an embodiment, after acquiring the table names and the field names on which the multiple outermost output fields depend layer by layer, the method further includes performing at least one of the following: prohibiting the masking operation for an output field in a clause related to an intermediate calculation in the SQL statement; or prohibiting the masking operation for an output field in a "where" conditional statement and/or a "limit" conditional statement in the SQL statement.

Clauses related to the intermediate calculation in the SQL statement includes GROUP BY, ORDER BY, SORT BY, DISTRBUTE BY, JOIN, UNION, LIKE, BETWEEN, and function clauses.

The data masking operation is performed for a derivation table in a "select" clause of an association derivation table in the SQL statement in one of the following manners: a preset masking rule corresponding to a table and a field name on which an output field queried by the "select" clause of the association derivation table depends is acquired, the preset masking rule is used as a masking rule of an output field corresponding to the output field name, and the data masking operation is performed for the derivation table according to the masking rule; or the "select" clause of the association derivation table is executed by the database, and after the "select" clause of the association derivation table is executed by the database, the derivation table is a derivation table for which the data masking operation has been performed according to the preset masking rule. The "select" clause includes a "create table as select" clause or an "insert into select" clause.

In an embodiment, after the database receives the SQL statement, in a case where the database determines that the current SQL statement has not been rewritten, and the database deeply traverse the AST to perform at least one of: acquiring an internal structure of the SQL statement and generating a dependency table of an output field queried by the SQL statement, wherein the dependency table records, in a tree form, table names and field names on which each output field depends layer by layer; acquiring each outermost output field queried by a "select" statement in the SQL statement and generating an outermost output field list queried by the "select" statement; or acquiring names of all created tables and inserted tables in the SQL statement. All created tables and inserted tables may be tables in the "create table as select" clause or the "insert into select" clause.

In an embodiment, for each output field in the outermost output field list queried by the "select" statement, the following steps are performed: selecting a first output field from the outermost output field list in a preset order; deeply traversing the dependency table to acquire a table name and a field name on which the first output field most deeply depends; acquiring a masking rule that is preset for the table name and the field name on which the first output field most deeply depends; and after determining that the SQL statement is the "select" statement, processing, according to the masking rule, a part of the SQL statement corresponding to the first output field to form a first SQL statement, and rewriting, by using the first SQL statement, an original value of an AST node corresponding to the first output field.

In an embodiment, after the masking rule for the table name and the field name on which the first output field most deeply depends is acquired and it is determined that the SQL statement is a "create table as select" statement or an "insert into select" statement, the masking rule is inserted into current output fields in all created tables and inserted tables of the database. The deepest dependency in the present application document may include the table name and field name to which an outer output field most deeply corresponds after the middle-layer correspondence is excluded from the multi-layer correspondence between the outermost output field and a table.

In an embodiment, after the original value of the AST node corresponding to the each output field in the outermost output field list is rewritten, the rewritten AST is traversed and a second SQL statement is re-synthesized, and the second SQL statement is determined as a finally executed SQL statement.

In an embodiment, after the rewritten AST is traversed and the second SQL statement is re-synthesized, and the second SQL statement is determined as the finally executed SQL statement, the database determines a to-be-executed physical plan according to the finally executed SQL statement; and the physical plan is executed and a processing result is fed back to the client.

In an embodiment, in the case where a database receives an SQL statement, the database execution engine performs the data filtering operation for the requested data includes generating an AST according to the SQL statement; traversing the AST to perform the following steps: in the case where one leaf node in the AST is a physical table, acquiring a table filtering rule of the physical table; in the AST, adding one child query node, where an original parent node of the leaf node is a parent node of the child query node and the leaf node is a child node of the child query node; applying the table filtering rule to the child query node; and after traversing the AST to perform the preceding steps, acquiring a re-synthesized AST, acquiring a re-synthesized SQL statement according to the re-synthesized AST, and executing the re-synthesized SQL statement.

In an embodiment, in the case where a database receives a non-SQL-type access request, performing the data protection operation for the requested data according to the preset policy includes acquiring, by the database, data requested by the non-SQL-type access request; and acquiring the preset policy corresponding to the data and sequentially performing, according to the preset policy, at least one of the following for each piece of data in a data set corresponding to the data: performing the data filtering operation for the each piece of data according to the filtering rule included in the preset policy; or parsing the each piece of data, calling and using the masking rule corresponding to each column to perform the data masking operation for the each column separately, and combining masked columns into each piece of masked data according to an original data format.

In an embodiment, the database is connected to a policy device, the policy device provides a policy model for one or more databases, and the policy device establishes the policy model according to at least one of an identity, a resource entity or a protection rule, where the protection rule includes a masking rule and/or a filtering rule.

In an embodiment, the policy device is externally connected to an API interface for receiving an input signal for configuring the policy model.

In an embodiment, the policy device is further configured to store a masking rule model, where the policy device determines the masking rule model of a sensitive-data domain according to at least one of a data masking operator or a data masking rule. The data masking operator includes a basic function for implementing data masking and the data masking rule includes a rule for data masking based on the data masking operator.

Another embodiment of the present application proposes a big-data sensitive-data protection method and device to solve the problem of high deployment costs, inadequate security mechanisms, inability to be completely transparent to users, low performance and inability to meet the requirements of dynamic real-time big-data protection in the related art.

This embodiment of the present application uses the following solution: a big-data database execution engine is embedded with a data protection device so that high-performance data masking function and data filtering function are achieved by using the distributed processing capability of the big-data database execution engine without changing the user request logic and the original data value. In the present application, the solution of using an external masking server is abandoned so that big-data private data can be protected efficiently in real time; and transparency to applications and users is implemented and users can be completely unaware of the data protection process so that seamless and transparent protection of sensitive data can be achieved.

The big-data sensitive-data protection device of this embodiment of the present application is composed of several parts described below. These parts may correspond to the network architecture in FIG. 2.

I. Big-data database client. The client may be an application, program, command or script that accesses big-data services and sends an access request to the big-data database execution engine through the network and receives the processing result.

In actual implementation, the big-data database client carries, in the request by default, the user name of a user that currently submits the access request, where this user name is used as the identity of the accessor.

The client can implement the above operation by using the related art.

II. Big-data database execution engine. The big-data database execution engine is in charge of logical processing of the services requested by the client.

The big-data database execution engine includes a request parsing module, an execution module, a result processing module and a data protection device.

In the present application, a data protection device is added to the big-data database execution engine. The device includes a data protection module and a policy proxy module for implementing the data protection function of the big-data database engine.

The data protection module is built in the big-data database engine and is in charge of real time data filtering and/or data masking function.

The policy proxy module is in charge of providing a protection policy query interface for the data protection module. The policy proxy module as a pluggable plug-in is deployed with the big-data database engine and is loaded and started by the big-data database engine.

III. Unified policy service. The unified policy service provides a unified data protection policy service for multiple big-data database engines simultaneously and includes a policy database, a policy management module and an algorithm management module. These three modules constitute the policy device of the present application.

The policy database is in charge of storing data protection policies and algorithm-related configuration data.

The policy management module has a unified built-in big-data protection policy model. The policy model abstracts access users, protected resource entities, and sensitive data protection rules. The policy model includes the three parts described below.

(1) Identity. The identity includes a user name, a user group name and a role name. The same user may belong to different user groups and may also belong to different roles. The identity represents the object to be controlled.

(2) Resource entity. The resource entity represents the need for big-data resources, is described by using a service name-database-table-column hierarchical model, and can manage the resources of multiple different big-data components simultaneously.

(3) Protection rule. The protection rule includes a column masking rule and a row filtering rule. A conversion algorithm for masking and data filtering can be performed by using the protection rule.

Identities and resource entities are in many-to-many correspondence. Resource entities and protection rules are also in many-to-many correspondence. The masking rule and the filtering rule may be used separately or in combination.

In an embodiment, based on the model policy management module, a set of API interfaces related to a policy configuration are provided for secondary development and an interface is provided for a system administrator or a compliance administrator to configure and manage the data protection policy of each big-data component through the interface.

The algorithm management module includes a unified framework for the development, deployment and management of big-data masking operators and masking rules. The algorithm management module can uniformly manage built-in and third-party masking operators and is provided with a management interface and an API interface for algorithm management.

To uniformly manage the masking algorithm of each big-data database execution engine, an embodiment of the present application proposes a big-data data masking algorithm management model that includes the three parts described below.

(1) Data masking operator. The data masking operator is a function executed by an actual data masking conversion and implements various algorithms and functions of masking that include, but are not limited to, replacement, randomness and encryption. The data masking operator resides, in the form of an algorithm library, in the big-data database execution engine.

(2) Data masking rule. The data masking rule is generated based on the capability of the data masking operator and according to the industry compliance requirements and meets the compliance requirements, and is used for transforming data of a specific data type.

(3) Sensitive-data domain. The sensitive-data domain classifies sensitive data and describes the function meaning of a column on the basis of column data or a column name. For example, "ID number" is a type of sensitive data. In this type, all ID number database data fields are managed and a unified masking rule is implemented. Each sensitive-data domain has a default masking rule.

The same masking operator can create multiple different masking rules. The same masking rule may be distributed in different sensitive-data domains. One sensitive-data domain includes multiple masking rules.

In this embodiment of the present application, the data masking server is abandoned and the big-data database client sends a data access request to the big-data database execution engine. The request carries the user name as the user identity by default. After received by the big-data database execution engine, the access request of the client is parsed by the request parsing module. The data protection module determines whether data filtering and data masking are needed for this request on the basis of the user identity information built-in a request session, the analysis of the content requested to be accessed, and in combination with the policy data acquired from the policy proxy. If data filtering is needed, data filtering is performed according to the data filtering conditions in the policy. If data masking is needed, data conversion is performed according to the corresponding masking rule in the masking policy. The data filtering process and the masking conversion process are performed concurrently by the execution module by using the distributed computing power of the cluster. The result after filtering and masking is returned to the client by the result processing module.

For an SQL-type big-data database engine (including, but not limited to, SparkSQL, Impala, Hive and Kylin), the data masking method in this embodiment of the present application does not destroy the traffic logic of the original SQL access request. In the present application, the abstract syntax tree generated after the SQL statement is parsed is deeply traversed and parsed so that the dependency between tables and fields related to the SQL statement is found and finally masking conversion is performed for only sensitive fields in the outermost output fields queried by the "select" statement. In this embodiment of the present application, sensitive fields in clauses such as GROUP BY/ORDER BY/SORT BY/DISTRBUTE BY/JOIN/UNION/LIKE/BETWEEN/function clauses in the SQL statement are not masked and sensitive fields in the WHERE and/or "limit" condition are not masked.

In actual implementation, in the case where a sensitive field exists in the "select" clause in "create table as select" and "insert into select" and a masking rule is configured for this field, two processing modes are provided in this embodiment of the present application to perform automatic masking conversion for such SQL and protect sensitive data of the derivation table.

Masking of the derivation table is processed in the two modes described below.

Mode 1: derivation mode. The masking rule corresponding to a table name and a field name on which an output field queried by the "select" clause of "create table as select" and "insert into select" depends is used as the masking rule of the output field. The masking rule is inserted into the protection policy library. When the derivation table is queried, masking conversion is performed according to the inserted masking rule. This mode does not modify the original data of the derivation table and is the default processing mode of this embodiment of the present application.

Mode 2: rewriting mode. The "select" clause of "create table as select" and "insert into select" is rewritten. The data of the derivation table after "create table as select" and "insert into select" are executed is masked data.

The data filtering of this embodiment of the present application is as follows: in the process of deeply traversing and analyzing the AST node generated by the AST "from" clause, the policy proxy interface is called to acquire the table filtering rule if the node of the current AST is a leaf node and a physical table, and the AST is re-synthesized and a child query node is added if are filtering rule of this table exists. The original parent node of the leaf node becomes the parent node of the child query node, and the leaf node is the child node of the child query node. The acquired filtering rule is applied to the child query node so that re-synthesization of the AST tree is completed.

In the data protection process of this embodiment of the present application, it is feasible to first execute the data filtering process to generate a re-synthesized AST and then execute the data masking process on the basis of this AST; or it is feasible to embed the data filtering process in the data masking process. The two modes lead to the same execution result of the data protection process.

For the SQL-type big-data database engine, the real-time protection process of sensitive data of this embodiment of the present application is described below.

In step 1, the client sends an SQL access request to the big-data database execution engine through the network. The request carries the user name as the user identity.

In step 2, the SQL parser of the big-data database engine performs lexical analysis for the SQL statement to obtain a general symbol stream for lexical analysis and then parses the symbol stream to construct a syntax tree.

In step 3, the SQL analyzer of the big-data database engine deeply analyzes non-analyzed relationship in the syntax tree to obtain the AST.

In step 4, the AST parsing module of the big-data database engine reversely parses the AST to obtain a decomposable object tree structure.

In step 5, the AST re-synthesization module of the big-data database engine re-synthesizes the AST and further abstracts and structurizes the SQL to generate a re-synthesized AST.

In step 6, the big-data database engine determines that the data protection function switch of this engine has been turned on and the current SQL statement has not been rewritten. If the two conditions are met at the same time, the big-data database execution engine enters the data protection process in step 7; otherwise, step 9 is performed.

In step 7, the data protection process begins; and the AST is deeply traversed and parsed so that SQL rewriting is performed for the part of sensitive fields in the SQL statement and the AST tree is re-synthesized. Step 7 includes the 11 substeps described below.

In step 7.1, the AST is deeply traversed so that an internal structure of the SQL statement is acquired and a dependency table of an output field is generated, where the dependency table records, in a tree form, table names and field names on which each output field depends layer by layer.

In the process of traversing and parsing the AST node generated by the AST "from" clause, the policy proxy interface is called to acquire the table filtering rule if the node of the current AST is a leaf node and a physical table, and the AST is re-synthesized and a child query node is added if are filtering rule of this table exists. The original parent node of the leaf node becomes the parent node of the child query node, and the leaf node is the child node of the child query node. The acquired filtering rule is applied to the child query node so that re-synthesization of the AST is completed.

In step 7.2, the AST is deeply traversed so that each outermost output field queried by a "select" statement is acquired and an outermost output field list queried by the "select" statement is generated.

In actual implementation, the case where the outermost query output fields are "*" indicates that the outermost query output fields are all the output fields in the next layer of the dependency table. The fields of the next layer are used as the final output fields of the outermost query. The rest can be done in the same manner.

In step 7.3, the AST is deeply traversed so that names (or aliases) of all created tables or inserted tables in the "create table" clause or the "insert" clause are acquired.

In actual implementation, the purpose of steps 7.1 to 7.3 is to deeply analyze the AST node to acquire the internal structure of the AST node; the sequence in which step 7.1, step 7.2 and step 7.3 are performed can be adjusted, and the generated internal structure of the AST node has the same result no matter which step is performed first.

In step 7.4, one output field name (or alias) is acquired in sequence from the outermost output field list queried by the "select" statement.

In step 7.5, the dependency table is deeply traversed so that the final table (or table alias) and field name (or field alias) on which the current output field depends are found.

In step 7.6, a policy proxy module interface (carrying the user name) is called to acquire the masking rule of the table name and the field name on which the current output field finally depends.

In step 7.7, if no masking rule is acquired, step 7.10 is performed.

If the current SQL statement is the "select" statement, step 7.8 is performed so that the SQL is rewritten.

If the current SQL statement is the "create table"/"insert" statement, the derivation table masking mode configured by the big-data database engine is acquired.

In the case of the rewriting mode, step 7.8 is performed so that the SQL is rewritten. In the case of the derivation mode, step 7.9 is performed so that a new masking rule is inserted.

In step 7.8, the value (a segment SQL statement) of the AST node corresponding to the current output field is rewritten, and the new SQL statement written according to the masking rule replaces the original value of the AST node.

In step 7.9, the policy proxy interface is called to insert the masking policy corresponding to the current output field into the data protection policy database. The resource table name corresponding to the masking policy is the table name (or alias) acquired in step 7.3. The masking rule is acquired in step 7.6. If multiple tables are available, a corresponding masking rule is inserted into each table.

In step 7.10, it is determined whether processing of all "select" outermost query output fields is completed; if the processing is not completed, then the remaining output fields are processed one by one according to steps 7.4 to 7.9.

In step 7.11, if the SQL is rewritten, the rewritten abstract syntax tree is traversed and resynthesized into a new SQL statement so that the finally executed SQL statement is generated, and the SQL rewriting flag is configured.

In actual implementation, the SQL rewriting flag is a control variable parameter of this embodiment of the present application.

In step 8, the big-data database execution engine determines that the data protection switch is turned on and the SQL has been rewritten; if the two conditions are met at the same time, step 2 is performed so that the rewritten SQL statement is submitted to the SQL parsing interface for reanalyzing the SQL statement; otherwise, step 9 is performed and subsequent process continues.

In step 9, the SQL optimizer of the big-data database engine optimizes most of the logical layers; the manipulation tree is transformed and operators are merged so that the number of jobs is reduced and the performance is improved.

In step 10, the executable-physical-plan module of the big-data database engine generates an executable physical plan and generates an executable big-data job.

In step 11, the execution module of the big-data database engine submits the executable big-data job to the distributed execution environment of the big-data database engine for distributed execution.

In step 12, after the execution is completed, the result processing module of the big-data database engine returns the result set data to the client.

In actual implementation, steps 1 to 5 and steps 9 to 12 are the existing functions and processes of the big-data database engine, steps 6 to 8 are new data protection processes of this embodiment of the present application, and the SQL statement executed by step 11 is executed concurrently on each distributed processing node.

In actual implementation, the data filtering process of this embodiment of the present application can be integrated into the data masking process; when the "from" clause is analyzed in step 7.1, the data filtering process is embedded; meanwhile, an adjustment may be made, the data filtering process is not executed in step 7.1 but added before step 7.1 so that a re-synthesized AST is generated, and the subsequent process remains the same.

Alternatively, the data filtering process and the data masking process serve as two separate subprocesses that are called in sequence: the data filtering process is performed first, that is, the data filtering process is inserted before the original step 7.1 so that a re-synthesized AST is generated, and then the original steps 7.1 to 7.11 are performed in sequence (the data filtering process in the original step 7.1 is no longer called).

Regardless of the execution sequence, the final execution result is the same.

For a non-SQL-type big-data database engine (including, but not limited to, KUDU), the data protection process of this embodiment of the present application is described below.

In step 1, the client application sends a data request to the big-data database engine server through the network through by using commands, scripts, applications, interface calls and the like, and the client carries, in the request, the user name information of the accessor.

In step 2, the server receives and parses the access request of the client.

In step 3, according to the distributed scheduling framework of the big-data database engine, the request is distributed to each processing node on which specific logic is executed.

In step 4, the processing node receives the data processing request, and according to the request traffic logic, the data that meets the requirements is queried and the query result set is acquired.

In actual implementation, after each distributed processing node obtains the result set, data filtering and masking are performed for the result set on each distributed processing node.

In step 5, the processing node determines whether the data protection function of the big-data database engine is turned on; if the data protection function is turned on, step 6 is performed; otherwise, step 9 is performed.

In step 6, the query result data set acquired in step 4 is filtered and masked.

In step 6.1, the policy proxy interface is called to acquire the data protection policy of the currently access user.

In step 6.2, according to the acquired data masking policy and in combination with the resource entity information of the user access request, it is determined whether the current request access data set needs to be masked.

In step 6.3, one piece of result data is acquired in sequence from the result set.

In step 6.4, it is determined, according to the data filtering rule, whether this one piece of result data meets the filtering condition; if the filtering condition is not met, step 6.5 is performed; otherwise, step 6.7 is performed.

In step 6.5, according to the determination result of step 6.2, it is determined whether the one piece of result data needs data masking; if masking is needed, step 6.6 is performed; otherwise, step 6.7 is performed.

In step 6.6, the current result data is parsed so that one or more columns that need masking are found, the columns are converted and masked one by one according to corresponding data masking rules, and the conversion results are combined into masked result data according to the original data format.

In step 6.7, it is determined whether processing of all the current data sets is completed. If the processing is not completed, step 6.3 is performed until all the acquired result set data is filtered and masked.

In step 7, the processing node encapsulates the result data and returns the result to the client.

In step 8, the client acquires and summarizes the results returned from the distributed processing nodes.

In actual implementation, steps 1 to 4 and steps 7 to 8 are the existing functions and processes of the big-data database engine in the related art, step 6 is the function flow of the data protection module, and steps 4 to 7 are executed concurrently on the processing nodes.

As shown in FIG. 2, the big-data sensitive-data protection device of this embodiment of the present application is composed of several parts described below.

I. Big-data database client. The client may be an application, program, command or script that accesses big-data services and sends an access request to the big-data database execution engine through the network and receives the processing result. The request of the big-data database client carries the user name as the user identity by default. The client can implement the above operation by using the related art.

II. Big-data database execution engine (also referred to as a big-data component, or a big-data engine component or a big-data database engine). The big-data database execution engine is in charge of logical processing of the services requested by the client.

The big-data database execution engine includes a request parsing module, an execution module, a result processing module and a data protection device.

In the present application, a data protection device is added to the big-data database execution engine. The device includes a data protection module and a policy proxy module for implementing the data protection function of the big-data database engine.

The data protection module is built in the big-data database engine and is in charge of real time data filtering and/or data masking function.

The policy proxy module is in charge of providing a protection policy query interface for the data protection module. The policy proxy module as a pluggable plug-in is deployed with the big-data database engine and is loaded and started by the big-data database engine. The plug-in method helps achieve separation of policy management from logic execution and facilitates function expansion.

The policy proxy module acquires the data protection policy configured by the execution engine from the policy management module of the present application and buffers the data protection policy into the local memory. The policy proxy module acquires the policy in this manner and provides a policy interface for the outside. In this manner, the policy management module of the present application can manage the data protection policies of multiple big-data database engines simultaneously. This is the default implementation of the policy proxy module plug-in.

After received by the big-data database execution engine, the access request of the client is parsed by the request parsing module. The data protection module determines whether data filtering and data masking are needed for this request on the basis of the user identity information, the analysis of the content requested to be accessed and in combination with the policy data acquired from the policy proxy. If data filtering is needed, data filtering is performed according to the data filtering conditions in the policy. If data masking is needed, data conversion is performed according to the corresponding masking rule in the masking policy. The data filtering process and the masking conversion process are performed concurrently by the execution module by using the distributed computing power of the cluster. The result after filtering and masking are returned to the client by the result processing module.

III. Unified policy service. The unified policy service provides a unified data protection policy service for multiple big-data database execution engines and includes a policy database, a policy management module and an algorithm management module. These three modules constitute the policy device of the present application.

The policy database is in charge of storing configuration data related to the policy management module and the algorithm management module.

The policy management module has a unified built-in big-data protection policy model. The policy model abstracts services, resources and access entities. It is achievable to create a resource model that can meet each big-data components, to perform flexible extension and to support a filtering and masking policy management of a new big-data database engine. In actual implementation, based on this module, an API interface related to a policy configuration is provided for secondary development and a management interface is provided for a system administrator or a compliance administrator to configure and manage the data protection policy of each big-data component through the management interface.

The algorithm management module includes a unified framework for the development, deployment and management of big-data masking operators and masking rules. The algorithm management module can uniformly manage built-in and third-party masking operators and is provided with a management interface and an API interface for algorithm management.

Figure 3:
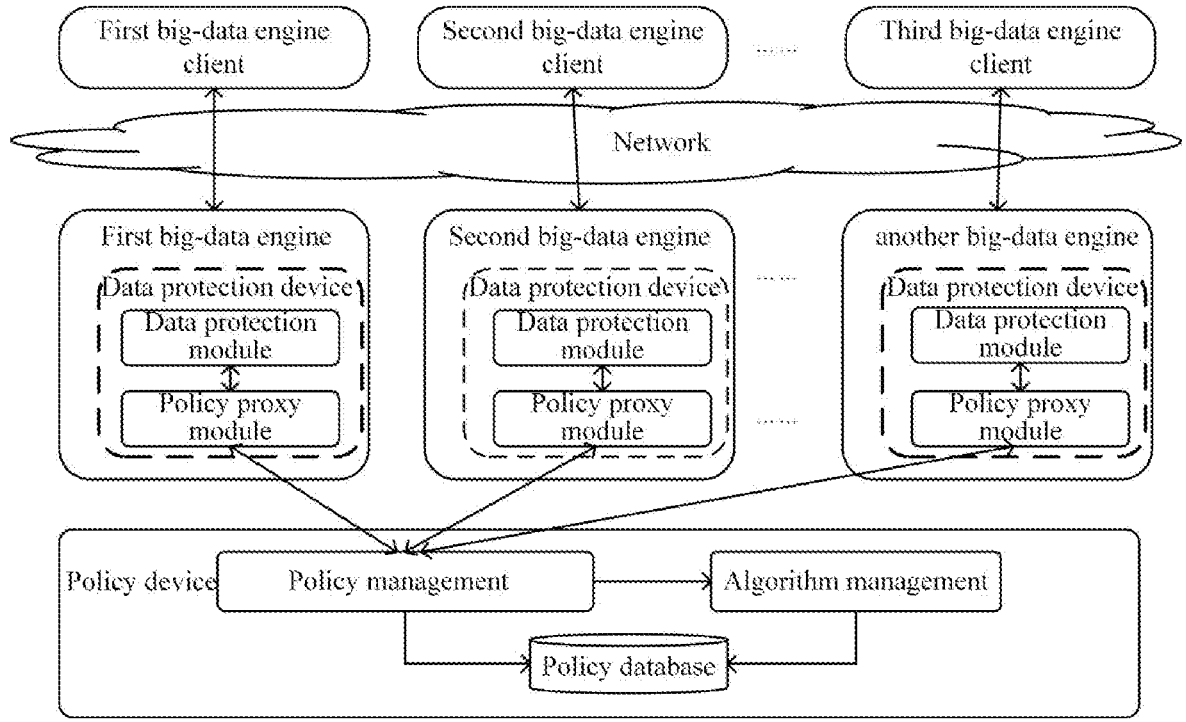
FIG. 3 is a schematic diagram of a data protection function supporting multiple big-data database engines according to another embodiment of the present application.

FIG. 3 is a schematic diagram of a data protection function supporting multiple big-data database engines according to another embodiment of the present application. As shown in FIG. 3, the method of the present application allows various big-data database engines to achieve the data protection function, and a unified protection policy is provided by a policy device. A data protection device is built into each big-data database engine (including, but not limited to, Hive, SparkSQL and Kylin), and data protection can be implemented by each big-data database engine according to the method of this embodiment of the present application. In FIG. 3, the first big-data engine is SparkSQL and the first big-data engine client is SparkSQL client correspondingly, and the second big-data engine is Impala and the second big-data engine client is Impala client correspondingly. The policy device may include policy management, algorithm management, and a policy database.

Figure 4:
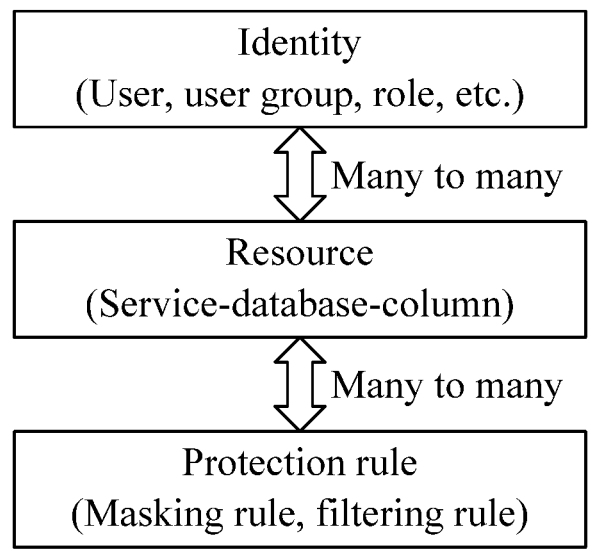
FIG. 4 is a schematic diagram of a data protection policy model according to another embodiment of the present application.

In view of the case where different big-data database engines have different resource models, a resource policy model is built into the policy management model. FIG. 4 is a schematic diagram of a data protection policy model according to another embodiment of the present application. As shown in FIG. 4, the model abstracts access users, protected resource entities, and sensitive data protection rules, and the policy model includes the three parts described below.

(1) Identity. The identity includes a user name, a user group name and a role name. The same user may belong to different user groups and may also belong to different roles. The identity represents the object to be controlled.

(2) Resource entity. The resource entity represents the need for big-data resources, is described by using a service name-database-table-column hierarchical model, and can manage the resources of multiple different big-data components can be managed simultaneously.

(3) Protection rule. The protection rule includes a column masking rule and a row filtering rule. A conversion algorithm for masking and data filtering can be performed by using the protection rule.

Identities and resource entities are in many-to-many correspondence. Resource entities and protection rules are also in many-to-many correspondence. The masking rule and the filtering rule may be used separately or in combination.

An instantiated policy model is shown in Table 1. Table 1 is a schematic table according to an embodiment of the present application.

and different masking rules can be configured for different types of access entities such as users/user groups/roles.

In addition, flexible data filtering rules may be implemented for different users, user groups and roles: the user Zhang San belongs to project group 1 and can acquire records belonging to only project group 1 of the T1 table in the DB1 database of the SparkSQL service; the user Li Si belongs to project group 1 and can acquire records belonging to only project group 1 of the T1 table in the DB1 database of the SparkSQL service.

The column masking rule and the row filtering rule can be used in flexible combination. For each identity, it is feasible to configure only the column masking rule, to configure only the row filtering rule, or to configure both the column masking rule and the row filtering rule.

For example, the user Zhang San is a low-privilege user, and for the F1 field of the T1 table in the DB1 database of the SparkSQL service, the full-masking rule is used; when Zhang San queries the F1 field of the T1 table in the DB1

TABLE 1

| Identity | | | Resource Entity | | | | Protection Rule | |
| --- | --- | --- | --- | --- | --- | --- | --- | --- |
| User Name | Group Name | Role | Service | Database Name | Table Name | Column Name | Masking Rule | Filtering Rule |
| Zhang San | Project group 1 | | sparksql | DB1 | T1 | F1 | Mask_Last_64 (col, 64, '*') | Groupid in (select e.groupid from employee e where e.group name = 'project group 1';' |
| Li Si | Project group 1 | | Sparksql | DB1 | T1 | F1 | Mask_Last_8 (col, 8, '*') | Groupid in (select e.groupid from employee e where e.group name = 'project group 1';' |
| | | Chief | Sparksql | DB1 | T1 | F1 | Mask_Last_2 (col, 2, '*') | |
| Wang Wu | | | Hive | DB1 | T1 | F1 | NULL | |

Identities and resource entities are in many-to-many correspondence. Resource entities and protection rules are also in many-to-many correspondence.

For example, the user Zhang San is a low-privilege user, and for the F1 field of the T1 table in the DB1 database of the SparkSQL service, the full-masking rule Mask_Last_64 is used; the user Li Si is a high-privilege user, and for the F1 field of the T1 table in the DB1 database of the SparkSQL service, the masking rule Mask_Last_8 of masking the last eight characters is used; the user whose role is the chief is a high-privilege user, and for the F1 field of the T1 table in the DB1 database of the SparkSQL service, the masking rule Mask_Last_2 of masking the last two characters is used.

Through the model of the present application, various fine-grained masking policy management can be supported, database of the SparkSQL service, the record set of only program group 1 is outputted and the F1 field is fully masked.

As described above, through the policy model of the present application, multiple big-data database engines can provide the data protection policy configuration function of fine-grained control.

Figures 5, 6:
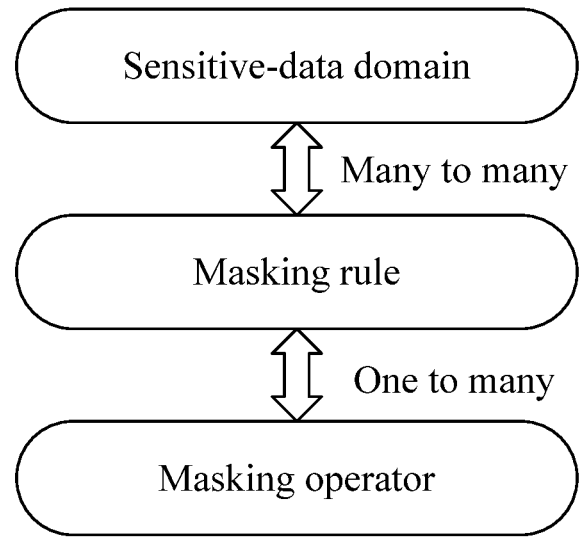
FIG. 5 is a schematic diagram of a data protection policy configuration according to another embodiment of the present application.
FIG. 6 is a schematic diagram of a masking algorithm management model according to another embodiment of the present application.

A schematic diagram of an interface for configuring a single protection policy for a big-data service is as shown in FIG. 5. FIG. 5 is a schematic diagram of a data protection policy configuration according to another embodiment of the present application. As shown in FIG. 5, the policy configuration steps are described below.

In step 1, the compliance administrator logs in to the system and enters the data protection policy configuration interface corresponding to the big-data database engine.

1. Big-data service name: indicates the service name corresponding to the big-data database engine in which the protection policy is to be configured, such as SparkSQL or Hive.

2. Identity: includes a user name, a user group name and a role name. The same user may belong to different user groups and may also belong to different roles. The identity represents the object to be controlled.

3. Resource entity: represents the need for big-data resources, is described by using a service name-database-table-column hierarchical model. For Hbase, the database is the namespace of Hbase. A column is represented by the column family: qualifier. Other databases such as Hive and SparkSql can correspond to a database-table-column hierarchical model. The resource entity supports configuration modes including fuzzy query and wildcard configuration.

4. Protection rule: includes a column masking rule and a row filtering rule. A conversion algorithm for masking and data filtering can be performed by using the protection rule.

Identities and resource entities are in many-to-many correspondence. Resource entities and protection rules are also in many-to-many correspondence. The masking rule and the filtering rule may be both configured, that is, the masking rule and the filtering rule may be used in combination.

In step 2, first the resource entity is selected as the protected object, the database, table, and column name are selected or filled in, and the column falls into the corresponding sensitive-data domain. It is feasible to perform association selection. For example, the tables of the database can be automatically associated after the database name is inputted. It is also feasible to write a wildcard so that tables meeting the wildcard condition are protected according to a unified rule.

In step 3, users/user groups/roles with restricted access to this protected object are selected.

In step 4, the sensitive-field column is selected and the corresponding masking rule like randomness, replacement or offset is selected; if no masking rule is configured, the default masking rule of the sensitive-data domain is used.

In step 5, the corresponding table data filtering policy is configured.

In step 6, after the data protection policy is stored in the policy database, configuration of a single policy is completed.

To uniformly manage the masking algorithm of each big-data database engine, the present application proposes a masking algorithm management model that includes the three parts described below. FIG. 6 is a schematic diagram of a masking algorithm management model according to another embodiment of the present application. As shown in FIG. 6, the sensitive-data domain, data masking rule and data masking operator are described below.

(1) The data masking operator is a function executed by an actual data masking conversion and implements various algorithms and functions of masking that include, but are not limited to, replacement, randomness and encryption. The data masking operator resides, in the form of an algorithm library, in the big-data database execution engine.

(2) The data masking rule is generated based on the capability of the data masking operator and according to the industry compliance requirements and meets the compliance requirements, and is used for transforming data of a specific data type.

(3) The sensitive-data domain classifies sensitive data and describes the function meaning of a column on the basis of column data or a column name. For example, "ID number" is a type of sensitive data. In this type, all ID number database data fields are managed and a unified masking rule is implemented. Each sensitive-data domain has a default masking rule.

The same data masking operator can create multiple different data masking rules. The same data masking rule may be distributed in different sensitive-data domains. One sensitive-data domain includes multiple data masking rules.

Table 2 lists the masking rule name, masking operator, and masking operator argument list.

TABLE 2

| Masking Rule Name | Masking Operator | Masking Operator Argument List |
| --- | --- | --- |
| Mask_Last_64 | Mask_Last_N | col, 64, '*' |
| Mask_Last_8 | Mask_Last_N | col, 8, '*' |
| Mask_Last_2 | Mask_Last_N | col, 2, '*' |

As shown in Table 2, the same masking operator Mask_Last_N generates three different masking rules, and different masking rules have different arguments for the operator: Mask_Last_64, Mask_Last_8, and Mask_Last_2. The parameter of Mask_Last_64 is col,64 and '*' masks the last 64 characters of the current column col. The parameter of Mask_Last_8 is col,8 and '*' masks the last 8 characters of the current column col. The parameter of Mask_Last_2 is col,2 and '*' masks the last 2 characters of the current column col. In this manner, different masking rules can be generated based on the same operator. These rules can be flexibly applied to different user entities to generate different masked data.

Each sensitive-data domain has a default masking rule. Table 3 describes a correspondence between sensitive-data domains and masking rules in this embodiment of the present application.

TABLE 3

| Sensitive-Data Domain Name | Default Masking Rule Name |
| --- | --- |
| Identity card domain | IDHidingUDF_Full |
| Bank card domain | CARDMaskHidingUDF_First_2 |
| Name domain | ChinaNameMaskHidingUDF_First_1 |

This type of sensitive data uses a masking rule for a sensitive-data domain by default, reducing the configuration workload. If the default rule does not meet the field's actual masking requirements, it is feasible to select a suitable rule from the masking rule list.

For an SQL-type big-data database engine (including, but not limited to, SparkSQL, Impala, Hive and Kylin), the data masking method of the present application does not destroy the traffic logic of the original SQL access request. In the present application, the abstract syntax tree generated after the SQL statement is parsed is deeply traversed and parsed so that the dependency between tables and fields related to the SQL statement is found and finally masking conversion is performed for only sensitive fields in the outermost output fields queried by the "select" statement. In the present application, sensitive fields in clauses such as GROUP BY/ORDER BY/SORT BY/DISTRBUTE BY/JOIN/UNION/LIKE/BETWEEN/function clauses in the SQL statement are not masked and sensitive fields in the WHERE and "limit" conditions are not masked.

For example, select zip, sum (salary) as salary from stuff group by zip having sum (salary)>15000.

If "zip" is a sensitive field, a conversion algorithm is configured for this field. According to the method of the present application, "zip" in the underlying statement "from stuff group by zip having sum (salary)>15000" is not masked and only the outermost select output field "zip" is masked.

Through the method of the present application, the masking capability of various complex SQL statements is supported and the masking capability of VIEW and CTE statements is also supported.

In actual implementation, in the case where a sensitive field exists in the "select" clause in "create table as select" and "insert into select" and a masking rule is configured for this field, two processing modes are provided in the present application to perform automatic masking conversion for such SQL and protect sensitive data of the derivation table.

Masking of the derivation table is processed in the two modes described below.

Mode 1: derivation mode. The masking rule corresponding to a table name (alias) and a field name (alias) on which an output field queried by the "select" clause of "create table as select" and "insert into select" depends is used as the masking rule of the output field. The masking rule is inserted into the protection policy library. When the derivation table is queried, masking conversion is performed according to the inserted masking rule. This mode does not modify the original data of the derivation table and is the default processing mode of the present application.

Mode 2: rewriting mode. The "select" clause of "create table as select" and "insert into select" is rewritten. The data of the derivation table after "create table as select" and "insert into select" are executed is masked data.

For example, statement 1: create table stuff_1 as select * from stuff; statement 2: insert into table stuff_2 select * from stuff. Some fields in the stuff table contain sensitive fields and the masking rule is configured for these fields. After statement 1 and statement 2 are executed, in mode 1, data in the created table stuff_1 is the original stuff data, data in the inserted table stuff_2 is the original stuff data, and masking conversion is performed according to the derivate masking rule when stuff_1 and stuff_2 are queried; in mode 2, data in the created table stuff_1 and the inserted table stuff_2 are both masked data of the stuff table.

The data filtering of this embodiment of the present application is as follows: in the process of deeply traversing and analyzing the AST node generated by the AST "from" clause, the policy proxy interface is called to acquire the table filtering rule if the node of the current AST is a leaf node and a physical table, and the AST is re-synthesized and a child query node is added if are filtering rule of this table exists. The original parent node of the leaf node becomes the parent node of the child query node, and the leaf node is the child node of the child query node. The acquired filtering rule is applied to the child query node so that re-synthesization of the AST is completed.

In the data protection process of the present application, it is feasible to first execute the data filtering process to generate a re-synthesized AST and then execute the data masking process on the basis of this AST; or it is feasible to embed the data filtering process in the data masking process. The two modes lead to the same execution result of the data protection process.

Figure 7:
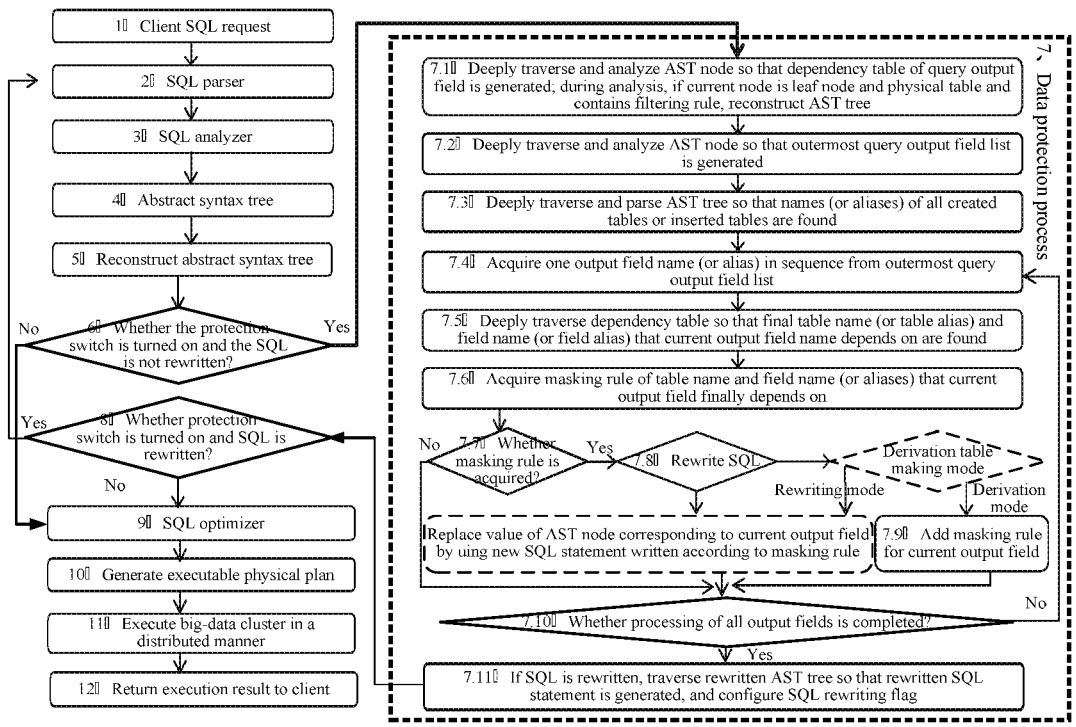
FIG. 7 is a flowchart of data protection of an SQL-type big-data database engine according to another embodiment of the present application.

FIG. 7 is a flowchart of data protection of an SQL-type big-data database engine according to another embodiment of the present application. As shown in FIG. 7, for the SQL-type big-data database engine, the real-time protection process of sensitive data of this embodiment of the present application is described below.

This process uses an example in which the data filtering process is embedded in the data masking process.

In step 1, client SQL request.

Here, in actual implementation, the client sends an SQL access request to the big-data database execution engine through the network. The request carries the user name as the user identity.

In step 2, SQL parser.

Here, in actual implementation, the SQL parser of the big-data database engine performs lexical analysis for the SQL statement to obtain a general symbol stream for lexical analysis and then parses the symbol stream to construct a syntax tree.

In step 3, SQL analyzer.

Here, in actual implementation, the SQL analyzer of the big-data database engine deeply analyzes non-analyzed relationship in the syntax tree to obtain the AST.

In step 4, the parsed abstract syntax tree.

Here, in actual implementation, the AST parsing module of the big-data database engine reversely parses the AST syntax tree to obtain a decomposable object tree structure.

In step 5, the re-synthesized abstract syntax tree.

Here, in actual implementation, the AST re-synthesization module of the big-data database engine re-synthesizes the AST and further abstracts and structurizes the SQL statement to generate a re-synthesized AST.

In step 6, it is determined whether the protection switch is turned on and the SQL statement is not rewritten.

Here, in actual implementation, the big-data database engine determines whether the data protection function switch of this engine has been turned on and the current SQL statement has not been rewritten. If the two conditions are met at the same time, step 7 enters the data protection process (as shown in the right part of FIG. 7); otherwise, step 9 is performed.

In step 7, the data protection process begins.

Here, in actual implementation, the data protection process begins; and the AST tree is deeply traversed and parsed so that SQL statement rewriting is performed for the part of sensitive fields in the SQL statement and the AST tree is re-synthesized.

In this embodiment, the parsing process of the abstract syntax tree generated by HIVE is used as an example.

In step 7.1, the AST node is deeply traversed and analyzed so that a dependency table of a query output field is generated. During the analysis, if the current node is a leaf node and a physical table and contains a filtering rule, the AST is re-synthesized.

The AST is deeply traversed and parsed so that an internal structure of the SQL statement is acquired and the dependency table "fromTables" of the query output field is generated, where the dependency table records, in a tree form, table names and field names on which each output field depends layer by layer.

In the process of traversing and parsing the AST node generated by the AST "from" clause, the policy proxy interface is called to acquire the table filtering rule if the node of the current AST is a leaf node and a physical table, and the AST is re-synthesized and a child query node is added if are filtering rule of this table exists. The original parent node of the leaf node becomes the parent node of the child query node, and the leaf node is the child node of the child query node. The acquired filtering rule is applied to the child query node so that re-synthesization of the AST tree is completed. In this manner, when the rewritten SQL statement is subsequently generated according to the AST, a segment SQL statement packed by the filtering rule is used as the subquery of the table, and the original physical table is used as the alias of the subquery.

In step 7.2, the AST node is deeply traversed and analyzed so that an outermost query output field list is generated.

The AST tree is deeply traversed so that each outermost output field queried by a "select" statement is acquired and the outermost output field list queried by the "select" statement is generated.

In actual implementation, the case where the outermost query output fields are "*" indicates that the outermost query output fields are all the output fields in the next layer of the dependency table. The fields of the next layer are used as the final output fields of the outermost query. The rest can be done in the same manner.

In step 7.3, the AST is deeply traversed and parsed so that names (or aliases) of all created tables or inserted tables are found.

The AST is deeply traversed so that names (or aliases) of all created tables or inserted tables in the "create table" clause or the "insert" clause are acquired.

In actual implementation, the purpose of steps 7.1 to 7.3 is to deeply analyze the AST node to acquire the internal structure of the AST node; the sequence in which step 7.1, step 7.2 and step 7.3 are performed can be adjusted, and the generated internal structure of the AST node has the same result no matter which step is performed first.

In step 7.4, one output field is acquired in sequence from the outermost query output field list.

One output field is acquired in sequence from the outermost output field list queried by the "select" statement.

In step 7.5, the dependency table is deeply traversed so that the final table name (or table alias) and field name (or field alias) on which the current output field depends are found.

In step 7.6, the masking rule of the table name (alias) and the field name (or alias) on which the current output field finally depends is acquired.

A policy proxy module interface (carrying a user name) is called to acquire the masking rule of the table name and the field name on which the current output field finally depends.

In step 7.7, it is determined whether the masking rule is acquired; if no masking rule is acquired, step 7.10 is performed; if the current SQL statement is the "select" statement, step 7.8 is performed so that the SQL statement is rewritten.

In step 7.8, the SQL statement is rewritten.

The original value (a segment SQL statement) of the AST node corresponding to the current output field is rewritten, and the new SQL statement written according to the masking rule replaces the original value of the AST node. If the output field contains no masking rule, no modification is made. If in the case of the "create table" statement/"insert" statement, the derivation table masking mode configured by the big-data database engine is acquired. If in the case of rewriting mode, step 7.8 is performed so that the SQL statement is rewritten. If in the case of derivation mode, step 7.9 is inserted so that a new masking rule is inserted.

In step 7.9, the masking rule is added for the current output field.

The policy proxy interface is called to insert the masking policy corresponding to the current output field into the data protection policy database. The resource table name corresponding to the masking policy is the table name (or table alias) acquired in step 7.3. The masking rule is acquired in step 7.6. If multiple tables are available, a corresponding masking rule is inserted into each table.

In step 7.10, it is determined whether processing of all "select" outermost query output fields is completed; if the processing is not completed, then the remaining output fields are processed one by one according to steps 7.4 to 7.9; if the processing is completed, step 7.11 is performed.

In step 7.11, if the SQL statement is rewritten, the rewritten AST is traversed so that the rewritten SQL statement is generated, and the SQL statement rewriting flag is configured, and then step 8 is performed.

If the SQL statement is rewritten, the rewritten abstract syntax tree is traversed and resynthesized into a new SQL statement so that the finally executed SQL statement is generated, and the SQL statement rewriting flag is configured as "rewritten" so that secondary modification can be avoided next time.

In actual implementation, the SQL statement rewriting flag is a control variable parameter of this embodiment of the present application.

In step 8, it is determined whether the protection switch is turned on and the SQL statement is rewritten; is the SQL statement is rewritten, step 2 is performed; otherwise, step 9 is performed.

After step 7.11 is performed, the big-data database execution engine determines that the data protection switch is turned on and the SQL statement has been rewritten; if the two conditions are met at the same time, step 2 is performed so that the rewritten SQL statement is submitted to the SQL parsing interface for reanalyzing the SQL statement; otherwise, step 9 is performed and subsequent process continues.

In step 9, SQL optimizer.

In actual implementation, the SQL optimizer of the big-data database engine optimizes most of the logical layers; the manipulation tree is transformed and operators are merged so that the number of jobs is reduced and the performance is improved.

In step 10, an executable physical plan is generated.

In actual implementation, the executable-physical-plan module of the big-data database engine generates an executable physical plan and generates an executable big-data job.

In step 11, a big-data cluster is executed in a distributed manner.

In actual implementation, the execution module of the big-data database engine submits the executable big-data job to the distributed execution environment of the big-data database engine for distributed execution.

In step 12, the execution result is returned to the client.

In actual implementation, after the execution is completed, the result processing module of the big-data database engine returns the result set data to the client.

In actual implementation, steps 1 to 5 and steps 9 to 12 are the existing functions and processes of the big-data database engine, steps 6 to 8 are new data protection processes of the present application, and the SQL statement executed by step 11 is executed concurrently on each distributed processing node.

In actual implementation, the data filtering process of this embodiment of the present application can be integrated into the data masking process; when the "from" clause is analyzed in step 7.1, the data filtering process is embedded; meanwhile, an adjustment may be made, the data filtering process is not executed in step 7.1 but added before step 7.1 so that a re-synthesized AST is generated, and the subsequent process remains the same.

Alternatively, the data filtering process and the data masking process serve as two separate subprocesses that are called in sequence: the data filtering process is performed first, that is, the data filtering process is inserted before the original step 7.1 so that a re-synthesized AST is generated, and then the original steps 7.1 to 7.11 are performed in sequence (the data filtering process in the original step 7.1 is no longer called).

Regardless of the execution sequence, the final execution result is the same.

Figure 8:
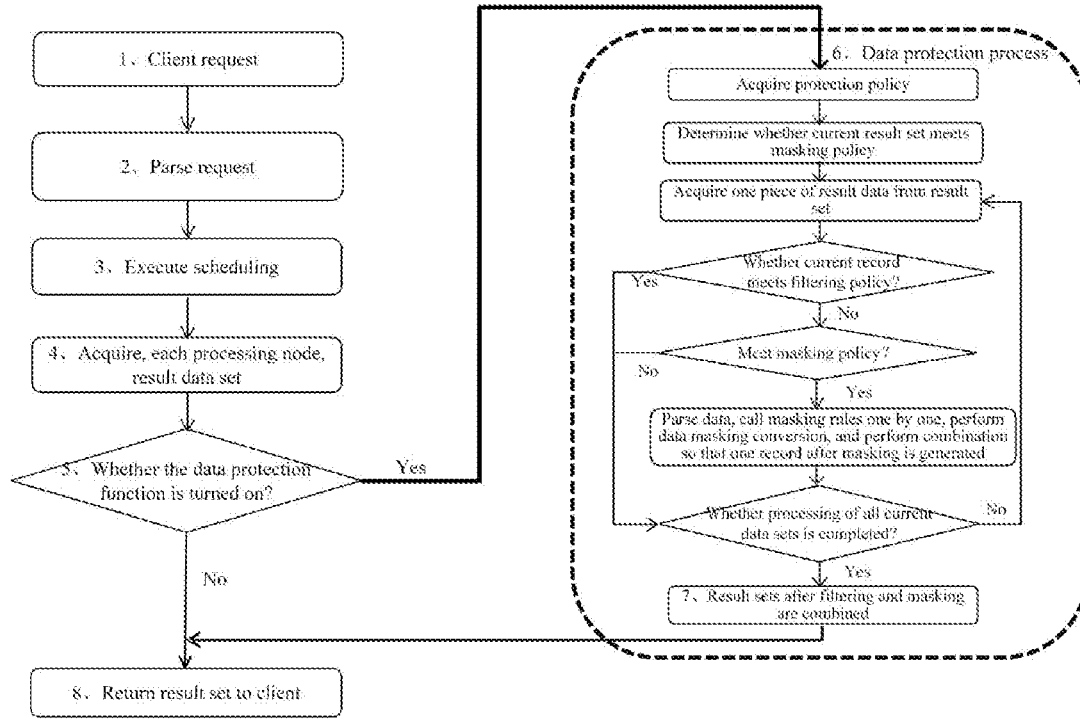
FIG. 8 is a flowchart of data protection of a non-SQL-type big-data database engine according to another embodiment of the present application.

For the data protection process of a non-SQL-type big-data database engine (including, but not limited to, KUDU), FIG. 8 is a flowchart of data protection of a non-SQL-type big-data database engine according to another embodiment of the present application. As shown in FIG. 8, the process includes the steps described below.

In step 1, client request.

In actual implementation, the client application sends a data request to the big-data database engine server through the network through by using commands, scripts, applications, interface calls and the like, and the client carries, in the request, the user name information of the accessor.

In step 2, request is parsed.

In actual implementation, the server receives and parses the access request of the client.

In step 3, scheduling is executed.

In actual implementation, according to the distributed scheduling framework of the big-data database engine, the request is distributed to each processing node on which specific logic is executed.

In step 4, each processing node acquires the result data set.

In actual implementation, the processing node receives the data processing request, and according to the request traffic logic, the data that meets the requirements is queried and the query result set is acquired.

In actual implementation, after each distributed processing node obtains the result set, data filtering and masking are performed for the result set on each distributed processing node.

In step 5, it is determined whether the data protection function is turned on; if the data protection function is turned on, step 6 is performed; otherwise, step 8 is performed.

In actual implementation, the processing node determines whether the data protection function of the big-data database engine is turned on.

In step 6, data protection process.

In actual implementation, the query result data set acquired in step 4 is filtered and masked.

In step 6.1, the protection policy is acquired.

In actual implementation, the policy proxy interface is called to acquire the data protection policy of the currently access user.

In step 6.2, it is determined whether the current result set meets the masking policy.

In actual implementation, according to the acquired data masking policy and in combination with the resource entity information of the user access request, it is determined whether the current request access data set needs to be masked.

In step 6.3, one piece of result data is acquired in sequence from the result set.

In actual implementation, one piece of result data (also called one record) is acquired in sequence from the result set.

In step 6.4, it is determined whether the current record meets the filtering policy.

In actual implementation, it is determined, according to the data filtering rule, whether this record meets the filtering condition; if the filtering condition is not met, step 6.5 is performed; otherwise, step 6.7 is performed.

In step 6.5, according to the determination result of step 6.2, it is determined whether the current record needs data masking; if masking is needed, step 6.6 is performed; otherwise, step 6.7 is performed.

In step 6.6, the data is parsed, the masking rules are called one by one, data masking conversion is performed to pack and generate a masked record.

In actual implementation, the current result data is parsed so that one or more columns that need masking are found, the columns are converted and masked one by one according to corresponding data masking rules, and the conversion results are combined into masked result data according to the original data format.

In step 6.7, it is determined whether processing of all current data sets is completed.

In actual implementation, it is determined whether processing of all the current data sets is completed. If the processing is not completed, step 6.3 is performed until all the acquired result set data is filtered and masked.

In step 7, the result sets after filtering and masking are packed.

In actual implementation, the processing node packs the result data.

In step 8, the result set is returned to the client.

In actual implementation, the client acquires and summarizes the results returned from the distributed processing nodes.

The data masking process and the data filtering process described here may be used separately or in combination.

In actual implementation, steps 1 to 4 and steps 7 to 8 are the existing functions and processes of the big-data database engine, step 6 is the function flow of the data protection module, and steps 4 to 7 are executed concurrently on the processing nodes.

The policy proxy module as a plug-in package is deployed with the big-data database engine and is loaded and started by the big-data database engine. The policy proxy module acquires the data protection policy configured by the execution engine from the policy management module of the present application and buffers the data protection policy. The policy proxy module acquires the policy in this manner and provides a policy interface for the outside. This is the default implementation of the policy proxy module plug-in.

The default implementation steps of the plug-in are described below.

In step 1, the policy proxy module as a plug-in package is deployed with the big-data database engine and is loaded and started by the big-data database engine, where only one type of policy proxy plug-in can be loaded.

In step 2, the data protection policy configured by the execution engine is acquired from the policy management module.

In step 3, after received by the execution engine, the access request of the client is parsed; and the data protection module determines whether data filtering and data masking are needed for this request on the basis of the user identity information, the analysis of the content requested to be accessed and in combination with the policy data acquired from the policy proxy.

In step 4, the policy proxy module provides the protection policy for the data protection module, audits the access request, and records users' access logs of sensitive data to enable traceability of sensitive data.

In step 5, the data protection module determines whether data filtering and data masking are needed for this request; if data filtering or masking is needed, the data is filtered and converted according to the corresponding filtering rule and masking rule in the policy, where the data filtering process and the masking conversion process are performed concurrently by using the distributed computing power of the cluster.

In step 6, the result after data filtering and masking is returned to the client by the big-data database engine.

Figure 9:
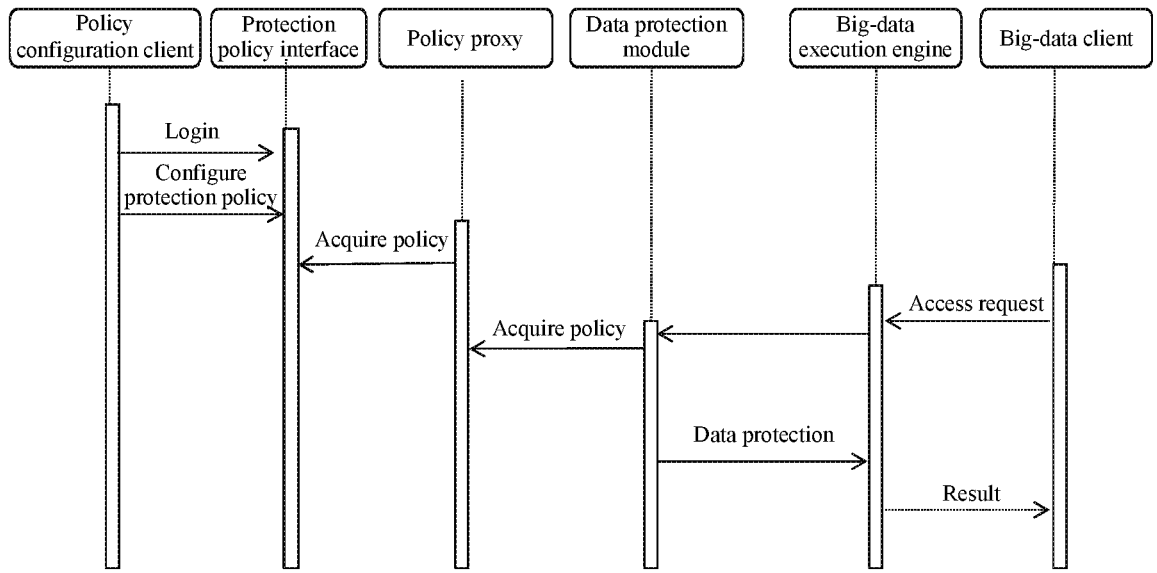
FIG. 9 is a flowchart of implementation of configuring a data protection policy through a policy management interface according to another embodiment of the present application.

The compliance administrator configures the sensitive-data protection policy for multiple big-data database engines through the policy management interface. Each big-data database engine acquires its own data protection policy and transparently protects the data in real time during the client access process. FIG. 9 is a flowchart of implementation of configuring a data protection policy through a policy management interface according to another embodiment of the present application. See FIG. 9.

In step 1, login.

In actual implementation, the compliance administrator uses his own account and password to log in to the policy management interface.

In step 2, the protection policy is configured. The compliance administrator enters the data protection policy configuration interface corresponding to the big-data component, configures the protected object through the interface, selects the big-data database engine service, database, table and column in sequence, selects users/user groups/roles with restricted access to this protected object, and then selects the sensitive-field column and selects the corresponding masking rule like randomness, replacement or offset and may also configure the corresponding table data filtering policy, where the data protection policy is stored in the policy database after the configuration is submitted.

In step 3, the policy proxy module acquires the policy from the policy database in step 2.

In actual implementation, the policy proxy module acquires the data protection policy.

In step 4, the big-data client initiates an access request.

In actual implementation, the big-data client directly initiates a query request to the big-data database engine.

In step 5, data protection.

In actual implementation, after received by the big-data execution engine, the access request of the client is parsed.

In step 6, the data protection module acquires the policy from the policy proxy module.

In actual implementation, the data protection module determines whether data filtering and data masking are needed for this request on the basis of the user identity information, according to the analysis of the content requested to be accessed, and in combination with the policy data acquired from the policy proxy.

In step 7, it is determined whether data filtering and data masking are needed for this request; if data filtering or masking is needed, the data is filtered and converted according to the corresponding filtering rule and masking rule in the policy, where the data filtering process and the masking conversion process are performed concurrently by using the distributed computing power of the cluster.

In step 8, the big-data database execution engine returns the execution result to the client.

Figure 10:
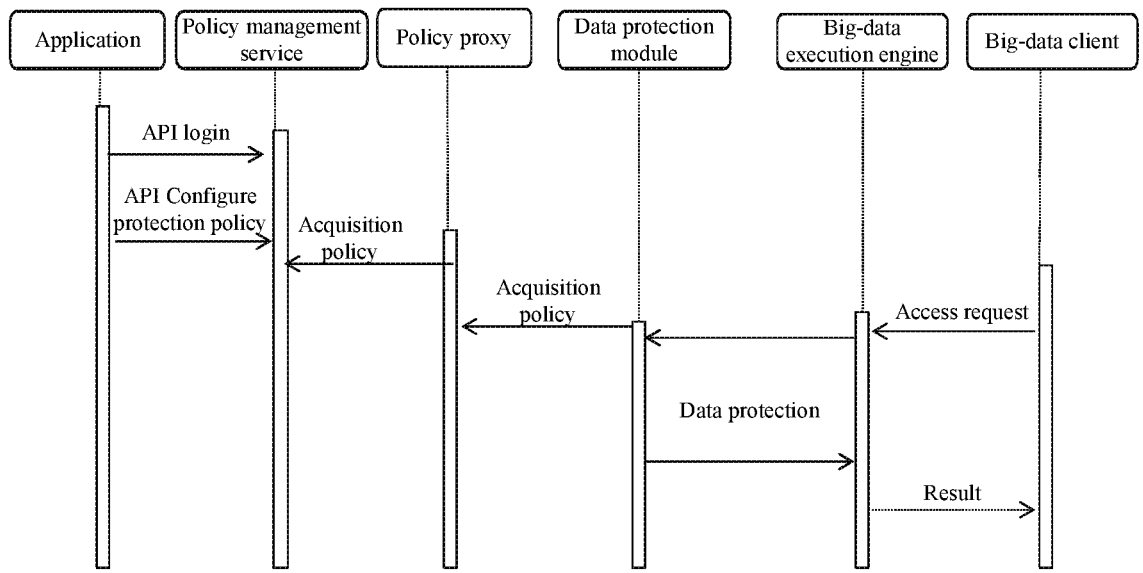
FIG. 10 is a flowchart of implementation of configuring a data protection policy through an API interface according to another embodiment of the present application.

The secondary developer or application calls a data protection policy interface through an API interface to configure the data protection policies of multiple big-data database engines. Each big-data database engine acquires its own data protection policy and transparently protects the data in real time during the client access process. FIG. 10 is a flowchart of implementation of configuring a data protection policy through an API interface according to another embodiment of the present application.

In step 1, API login.

In actual implementation, the secondary developer or application performs user authentication through an API authentication interface. An account and a password are built into the interface. The policy management module authenticates the user identity of the API caller.

In step 2, the protection policy is configured through API.

In actual implementation, after identity authentication is successful, the secondary developer or application calls the policy configuration API interface provided by the policy management module, configures the protected object through the interface, selects the big-data database engine service, database, table and column in sequence, selects users/user groups/roles with restricted access to this protected object, and then selects the sensitive-field column and selects the corresponding masking rule like randomness, replacement or offset and may also configure the corresponding table data filtering policy, where the data protection policy is stored in the policy database after the interface is called successfully.

In step 3, the policy proxy module acquires the data protection policy from the policy database.

In step 4, the big-data client initiates an access request.

In actual implementation, the big-data client directly initiates a query request to the big-data database engine.

In step 5, after received by the big-data execution engine, the access request of the client is parsed.

In step 6, the data protection module acquires the policy from the policy proxy module.

In actual implementation, the data protection module determines whether data filtering and data masking are needed for this request on the basis of the user identity information, according to the analysis of the content requested to be accessed, and in combination with the policy data acquired from the policy proxy.

In step 7, the data protection module determines whether data filtering and data masking are needed for this request; if data filtering or masking is needed, the data is filtered and converted according to the corresponding filtering rule and masking rule in the policy, where the data filtering process and the masking conversion process are performed concurrently by using the distributed computing power of the cluster.

In step 8, the big-data database execution engine returns the execution result to the client.

Figure 11:
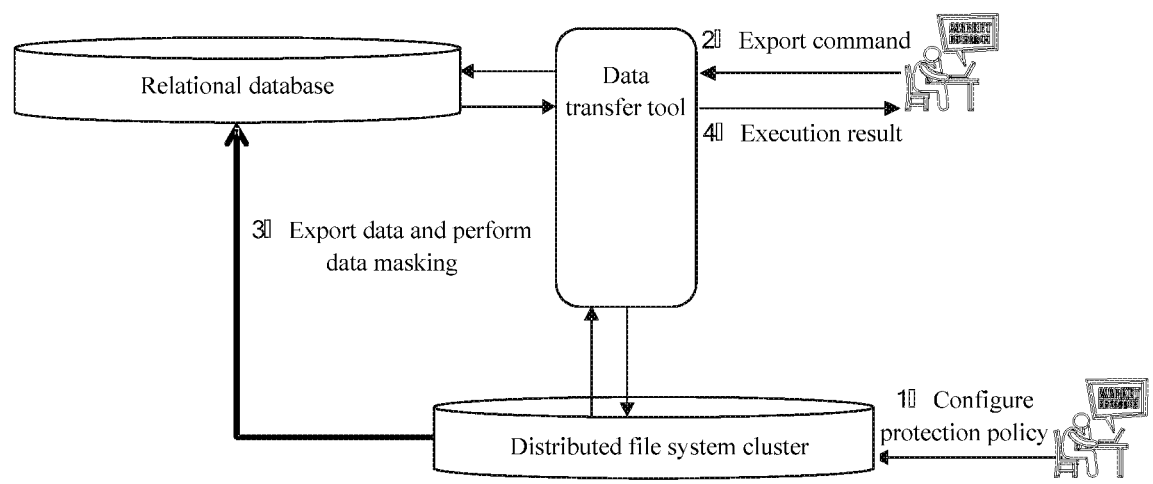
FIG. 11 is a flowchart of data protection in a data import or export process according to another embodiment of the present application.

Sqoop (including Sqoop1 and Sqoop2 versions) is a data transfer tool used to transfer data between Hadoop (distributed file system) and a relational database. Sqoop can export data from a large database such as Hive to the relational database (such as mysql or oracle). After the masking policy is configured in the big-data database engine, the Sqoop tool can automatically implement the data masking function in the data export process and export the masked data to the relational database. Using Hive as an example, FIG. 11 is a flowchart of data protection in a data import or export process according to another embodiment of the present application. See FIG. 11.

In step 1, the protection policy is configured.

In actual implementation, the compliance administrator sorts out sensitive information and configures the masking policy of a Hive sensitive field according to the industry compliance requirements. Users with different identities have different policies.

In step 2, the client delivers an export command.

In actual implementation, the Sqoop client command is used to export Hive data to the relational database. The Sqoop export command can specify source and target databases, tables, and conditional expressions.

In step 3, the data is exported and data masking is performed.

In actual implementation, Sqoop sends a data query request to the Hive execution engine; when receiving the data query request, the Hive execution engine masks the result data on the basis of the user's identity information according to the masking policy configured in step 1, and writes the masked data to the relational database.

In step 4, the execution result is returned to the client.

In actual implementation, Sqoop returns the command execution result to the client.

The process of this embodiment can be used as an implementation process of a big-data static masking program.

Compared with the related art, the method and device of embodiments of the present application have the following advantages: first, no separate masking server is required, thus saving additional software and hardware costs; second, the highest execution efficiency is achieved, the data filtering function and the data masking function are implemented with high performance by fully using the distributed computing power of the big-data database execution engine, and the needs of big-data efficient static and dynamic data masking can be both met; third, complete transparency to applications and users is achieved, the traffic logic is not changed, the original data is not destroyed and unware application is ensured; meanwhile, the method and device of embodiments of the present application have a high security coefficient and intermediate data does not land, thus reducing the risk of data leakage. In actual implementation, automatic masking conversion can be implemented between tables having an inheritance relationship with each other, thus data security is fully protected. In addition, the method and device of embodiments of the present application have a strong expansion capability and have a unified policy management and algorithm management framework. The data protection method of the present application can be extended to the field of big data, and can implement the sensitive-data protection capabilities of various big-data database engines, including mainstream offline, interactive, online computing and other SQL-type or non-SQL-type big-data database engines.

From the description of the preceding implementations, it will be apparent to those skilled in the art that the method of any one of the preceding embodiments may be implemented by use of software plus a necessary general-purpose hardware platform, or may, of course, be implemented by hardware, but in many cases, the former is a preferred implementation. Based on this understanding, the solution provided in the present application substantially, or the part contributing to the related art, may be embodied in the form of a software product. The software product is stored in a storage medium (such as a Random Access Memory (ROM)/Random Access Memory (RAM), a magnetic disk or an optical disk) and includes several instructions for enabling a terminal (which may be a mobile phone, a computer, a server or a network device) to perform the method according to each embodiment of the present application.

An embodiment of the present application provides a data protection device configured to implement the preceding embodiments and preferred implementations. What has been described will not be repeated. As used below, the term "module" is implemented by a combination of software and/or hardware capable of implementing preset functions. The device of the following embodiment is preferably implemented by software, but implementation by hardware or by a combination of software and hardware is also possible and conceived.

Another embodiment of the present application provides a data protection device. The device includes a receiving module and a data protection module.

The receiving module is configured to receive data request information sent by a client.

The data protection module is configured to acquire a preset policy corresponding to an identity of the client carried in the data request information and perform a data protection operation for requested data according to the preset policy to obtain target data.

In an embodiment, the device may further include a sending module configured to send the target data to the client.

In an embodiment, the data protection module further includes a policy proxy module configured to acquire a data protection policy corresponding to the policy device and provide a protection policy query interface for the data protection module.

In an embodiment, the data protection module is further configured to perform a data filtering operation and/or a data masking operation for the requested data according to the preset policy, where the preset policy includes a filtering rule and/or a masking rule.

In an embodiment, the data protection module performs the data filtering operation and/or the data masking operation for the requested data in one of the following manners: the data protection module performs the data masking operation after performing the data filtering operation for the requested data; embeds a data filtering operation flow during a process of the data masking operation; performs the data filtering operation for the requested data; or performs the data masking operation for the requested data.

In an embodiment, in the case where a database receives an SQL statement is received by the database, the data protection module is further configured to generate an Abstract Syntax Tree (AST) according to the SQL statement; to deeply traverse the AST to acquire table names and field names on which multiple outermost (top) output fields of the SQL statement depend layer by layer; and to perform the data masking operation for output fields corresponding to the field names in the multiple outermost output fields of the SQL statement.

In the present application document, the table name may also be the alias of a table and the field name may be the alias of a field.

In an embodiment, after acquiring the table names and the field names on which the multiple outermost output fields depend layer by layer, the device is further configured to perform at least one of: prohibiting the masking operation for an output field in a clause related to an intermediate calculation in the SQL statement; or prohibiting the masking operation for an output field in a "where" conditional statement and/or a "limit" conditional statement in the SQL statement.

Clauses related to the intermediate calculation in the SQL statement includes GROUP BY, ORDER BY, SORT BY, DISTRBUTE BY, JOIN, UNION, LIKE, BETWEEN, and function clauses.

The data masking operation is performed for an association derivation table in a "select" clause (the "select" clause includes a "create table as select" clause or an "insert into select" clause) of the association derivation table in the SQL statement in one of the following manners: a preset masking rule corresponding to a table name and a field name on which an output field queried by the "select" clause of the association derivation table depends is acquired, the preset masking rule is used as a masking rule of an output field corresponding to the output field name, and the data masking operation is performed for the derivation table according to the masking rule; or the "select" clause of the association derivation table is executed by the database, and after the "select" clause of the association derivation table is executed by the database, the derivation table is a derivation table for which the data masking operation has been performed according to the preset masking rule.

In an embodiment, after the database receives the SQL statement, in a case where the database determines that the SQL statement has not been rewritten, and the database deeply traverses the AST to perform at least one of: acquiring an internal structure of the SQL statement and generating a dependency table of an output field queried by the SQL statement, where the dependency table records, in a tree form, table names and field names on which each output field depends layer by layer; acquiring each outermost output field queried by a "select" statement in the SQL statement and generating an outermost output field list queried by the "select" statement; or acquiring names of all created tables and inserted tables (which may be tables in the "create table" clause or the "insert" clause in an embodiment) in the SQL statement.

In an embodiment, for each output field in the outermost output field list queried by the "select" statement, the following steps are performed: selecting a first output field from the outermost output field list in a preset order; deeply traversing the dependency table to acquire a table name and a field name on which the first output field most deeply depends; acquiring a masking rule that is preset for the table name and the field name on which the first output field most deeply depends; and after determining that the SQL statement is the "select" statement, processing, according to the masking rule, a part of the SQL statement corresponding to the first output field to form a first SQL statement, and rewriting, by using the first SQL statement, an original value of an AST node corresponding to the first output field.

In an embodiment, after the masking rule for the table name and the field name on which the first output field most deeply depends is acquired and it is determined that the SQL statement is a "create table as select" statement or an "insert into select" statement, the masking rule is inserted into current output fields in all created tables and inserted tables of the database.

In an embodiment, after the original value of the AST node corresponding to the each output field in the outermost output field list is rewritten, the rewritten AST is traversed and a second SQL statement is re-synthesized, and the second SQL statement is determined as a finally executed SQL statement.

In an embodiment, after the rewritten AST is traversed and the second SQL statement is re-synthesized, and the second SQL statement is determined as the finally executed SQL statement, the database determines a to-be-executed physical plan according to the finally executed SQL statement; and the physical plan is executed and a processing result is fed back to the client.

In an embodiment, in the case where a database receives a Structured Query Language (SQL) statement, performing, by the database execution engine, the data filtering operation for the requested data includes generating an Abstract Syntax Tree (AST) according to the SQL statement; traversing the AST to perform the following steps: in the case where one leaf node in the AST is a physical table, acquiring a table filtering rule of the physical table; in the AST, adding one child query node, where an original parent node of the leaf node is a parent node of the child query node and the leaf node is a child node of the child query node; applying the table filtering rule to the child query node; and after traversing the AST to perform the preceding steps, acquiring a re-synthesized AST, acquiring a re-synthesized SQL statement according to the re-synthesized AST, and executing the re-synthesized SQL statement.

In an embodiment, in the case where a database receives a non-SQL-type access request, performing the data protection operation for the requested data according to the preset policy includes acquiring, by the database, data requested by the non-SQL-type access request; and acquiring the preset policy corresponding to the data and sequentially performing, according to the preset policy, at least one of the following for each piece of data in a data set corresponding to the data: performing the data filtering operation for the each piece of data according to the filtering rule included in the preset policy; or parsing the each piece of data, calling and using the masking rule corresponding to each column to perform the data masking operation for the each column separately, and combining masked columns into each piece of masked data according to an original data format.

In an embodiment, the database is connected to a policy device, the policy device provides a policy model for one or more databases, and the policy device establishes the policy model according to at least one of an identity, a resource entity or a protection rule, where the protection rule includes a masking rule and/or a filtering rule.

In an embodiment, the policy device is externally connected to an API interface for receiving an input signal for configuring the policy model.

In an embodiment, the policy device is further configured to store a masking rule model, where the policy device determines the masking rule model according to at least one of a data masking operator or a data masking rule. The data masking operator includes a basic function for implementing data masking and the data masking rule includes a rule for data masking based on the data masking operator.

It is to be noted that the various modules described above may be implemented by software or hardware. Implementation by hardware may, but may not necessarily, be performed by the following method: the various modules described above are located in a same processor; or, in any combination, the various modules are located in different processors.

Another embodiment of the present application provides a storage medium that stores a computer program. When the computer program is executed, the method provided in any one of the preceding embodiments is performed.

An embodiment of the present application provides an electronic device that includes a memory and a processor. The memory stores a computer program and the processor is configured to execute the computer program to perform steps of any one of the preceding method embodiments.

Apparently, those skilled in the art should know that each preceding module or step of the present application may be implemented by a universal computing device, they may be concentrated on a single computing device or distributed in a network formed by multiple computing devices, and for example, they may be implemented by program codes executable by the computing devices, so that they may be stored in a storage device for execution by the computing devices, and in some circumstances, the illustrated or described steps may be executed in sequences different from those described herein, or they may be made into various integrated circuit modules separately, or multiple modules or steps therein may be made into a single integrated circuit module for implementation. Therefore, the present application is not limited to any specific combination of hardware and software.

The above are only embodiments of the present application and are not intended to limit the present application. For those skilled in the art, the present application may have various modifications and variations. Any modifications, equivalent substitutions, improvements and the like made within the spirit and the principle of the present application are within the scope of the present application.

What is claimed is:

1. A data protection method, comprising:
   receiving, by a database execution engine, data request information sent by a client;
   acquiring a preset policy corresponding to an identity of the client carried in the data request information; and
   performing, by the database execution engine according to the preset policy, a data protection operation for requested data to obtain target data;
   wherein the performing, by the database execution engine according to the preset policy, the data protection operation for the requested data comprises: performing, by the database execution engine, a data masking operation for the requested data according to the preset policy, wherein the preset policy comprises a masking rule; and
   wherein the performing, by the database execution engine, the data masking operation for the requested data according to the preset policy comprises: according to the masking rule corresponding to the identity of the client, performing data conversion on data of a sensitive-data domain in the requested data, and wherein the masking rule is used for transforming the data of the sensitive-data domain in the requested data.

2. The method of claim 1, wherein performing, by the database execution engine according to the preset policy, the data protection operation for the requested data further comprises:
   performing, by the database execution engine according to the preset policy, a data filtering operation for the requested data according to the preset policy, wherein the preset policy comprises a filtering rule.

3. The method of claim 2, wherein performing, by the database execution engine, data filtering operation and the data masking operation for the requested data comprises one of:
   performing the data masking operation for the requested data after performing the data filtering operation for the requested data; or
   embedding a data filtering operation flow during a process of the data masking operation.

4. The method of claim 1, wherein in a case where a Structured Query Language (SQL) statement is received by the database execution engine, performing, by the database execution engine according to the preset policy, the data masking operation for the requested data comprises:
   generating an Abstract Syntax Tree (AST) according to the SQL statement;
   deeply traversing the AST to acquire table names and field names on which multiple outermost output fields of the SQL statement depend layer by layer; and
   performing the data masking operation for output fields corresponding to the field names in the multiple outermost output fields of the SQL statement.

5. The method of claim 4, wherein after acquiring the table names and the field names on which the multiple outermost output fields depend layer by layer, the method further comprises at least one of:
   prohibiting the masking operation for an output field in a clause related to an intermediate calculation in the SQL statement; or
   prohibiting the masking operation for an output field in a "where" conditional statement and/or a "limit" conditional statement in the SQL statement.

6. The method of claim 4, wherein the data masking operation is performed for a derivation table in a "select" clause of an association derivation table in the SQL statement by one of:
   acquiring a preset masking rule corresponding to a table and a field name on which an output field name, queried by the "select" clause of the association derivation table, depends, taking the preset masking rule as a masking rule of an output field corresponding to the output field name, and performing the data masking operation for the derivation table according to the masking rule; or
   executing the "select" clause of the association derivation table, wherein the derivation table is a derivation table for which the data masking operation has been performed according to the preset masking rule after the database execution engine executes the "select" clause of the association derivation table.

7. The method of claim 4, wherein after the database execution engine receives the SQL statement, in a case where the database determines that the SQL statement has not been rewritten, the database deeply traverse the AST to perform at least one of:
   acquiring an internal structure of the SQL statement and generating a dependency table of an output field queried by the SQL statement, wherein the dependency table records, in a tree form, tables and fields on which each output field depends layer by layer;
   acquiring each outermost output field queried by a "select" statement in the SQL statement and generating an outermost output field list queried by the "select" statement; or
   acquiring names of all created tables and inserted tables in the SQL statement.

8. The method of claim 7, wherein for each output field in the outermost output field list queried by the "select" statement, following steps are performed:
   selecting a first output field from the outermost output field list in a preset order;
   deeply traversing the dependency table to acquire a table name and a field name on which the first output field most deeply depends;
   acquiring a masking rule that is preset for the table name and the field name on which the first output field most deeply depends; and
   after determining that the SQL statement is the "select" statement, processing, according to the masking rule, a part of the SQL statement corresponding to the first output field to form a first SQL statement, and rewriting, by using the first SQL statement, an original value of an AST node corresponding to the first output field.

9. The method of claim 8, wherein after acquiring the masking rule for the table name and the field name on which the first output field most deeply depends and determining that the SQL statement is a "create table as select" statement or an "insert into select" statement, the method further comprises:
inserting the masking rule into current output fields in all created tables and inserted tables of the database execution engine.

10. The method of claim 8, wherein after rewriting the original value of the AST node corresponding to the each output field in the outermost output field list, the method further comprises:
traversing the rewritten AST and re-synthesizing a second SQL statement, and determining the second SQL statement as a finally executed SQL statement.

11. The method of claim 10, wherein after traversing the rewritten AST and re-synthesizing the second SQL statement, and determining the second SQL statement as the finally executed SQL statement, the method further comprises:
determining, by the database execution engine, a to-be-executed physical plan according to the finally executed SQL statement; and
executing the physical plan and feeding back a processing result to the client.

12. The method of claim 2, wherein in a case where a Structured Query Language (SQL) statement is received by the database execution engine, performing, by the database execution engine, the data filtering operation for the requested data comprises:
generating an Abstract Syntax Tree (AST) according to the SQL statement;
traversing the AST to perform following steps:
in a case where one leaf node in the AST is a physical table, acquiring a table filtering rule of the physical table;
in the AST, adding one child query node, wherein an original parent node of the leaf node is a parent node of the child query node and the leaf node is a child node of the child query node; and
applying the table filtering rule to the child query node; and
after traversing the AST to perform the preceding steps, acquiring a re-synthesized AST, acquiring a re-synthesized SQL statement according to the re-synthesized AST, and executing the re-synthesized SQL statement.

13. The method of claim 2, wherein in a case where a non-SQL-type access request is received by the database execution engine, performing the data protection operation for the requested data according to the preset policy comprises:
acquiring, by the database execution engine, data requested by the non-SQL-type access request; and
acquiring the preset policy corresponding to the data and sequentially performing, according to the preset policy corresponding to the data, at least one of the following for each piece of data in a data set corresponding to the data:
performing the data filtering operation for the each piece of data according to the filtering rule comprised in the preset policy corresponding to the data; or
parsing the each piece of data, calling and using a masking rule corresponding to each column to perform the data masking operation for the each column separately, and combining masked columns into each piece of masked data according to an original data format.

14. The method of claim 1, wherein the database execution engine is connected to a policy device, the policy device provides a policy model for one or more database execution engines, and the policy device establishes the policy model according to at least one of an identity, a resource entity or a protection rule, wherein the protection rule comprises at least one of the masking rule or a filtering rule.

15. The method of claim 14, wherein the policy device is externally connected to an Application Program Interface (API) for receiving an input signal for configuring the policy model.

16. The method of claim 14, wherein the policy device further stores a masking rule model, wherein the policy device determines the masking rule model according to at least one of a data masking operator or a data masking rule, wherein
the data masking operator comprises a basic function for implementing data masking, and the data masking rule comprises a rule for data masking based on the data masking operator.

17. A data protection device, comprising a processor and a memory for storing execution instructions that when executed by the processor cause the processor to perform steps in following modules:
a receiving module, which is configured to receive data request information sent by a client; and
a data protection module, which is configured to acquire a preset policy corresponding to an identity of the client carried in the data request information and perform a data protection operation for requested data according to the preset policy to obtain target data;
wherein the data protection module is configured to perform a data masking operation for the requested data according to the preset policy, wherein the preset policy comprises a masking rule; and
wherein the data protection module is configured to according to the masking rule corresponding to the identity of the client, perform data conversion on data of a sensitive-data domain in the requested data, and wherein the masking rule is used for transforming the data of the sensitive-data domain in the requested data.

18. A non-transitory storage medium, which stores a computer program, wherein when the computer program is executed, the data protection method of claim 1 is performed.

19. An electronic device, which comprises a memory and a processor, wherein the memory stores a computer program and the processor is configured to execute the computer program to perform the data protection method of claim 1.

* * * * *